United States Patent
Franklin

(10) Patent No.: US 7,697,945 B2
(45) Date of Patent: Apr. 13, 2010

(54) CROSS-CARRIER CONTENT UPLOAD, SOCIAL NETWORK AND PROMOTIONAL PLATFORM

(76) Inventor: Jeffrey M. Franklin, 16205 143rd Ave., SE., Renton, WA (US) 98058

( * ) Notice: Subject to any disclaimer, the term of this patent is extended or adjusted under 35 U.S.C. 154(b) by 0 days.

(21) Appl. No.: 12/468,836

(22) Filed: May 19, 2009

(65) Prior Publication Data

US 2009/0221312 A1 Sep. 3, 2009

Related U.S. Application Data

(63) Continuation of application No. 12/049,748, filed on Mar. 17, 2008.

(60) Provisional application No. 60/896,791, filed on Mar. 23, 2007.

(51) Int. Cl.
*H04W 4/00* (2006.01)
(52) U.S. Cl. .................................... 455/466; 455/414.1
(58) Field of Classification Search .................. None
See application file for complete search history.

(56) References Cited

U.S. PATENT DOCUMENTS 7,302,254 B2 11/2007 Valloppillil
2005/0289590 A1* 12/2005 Cheok et al. .................. 725/37
2006/0282738 A1* 12/2006 Sohn et al. ................... 714/748
2007/0255785 A1* 11/2007 Hayashi et al. .............. 709/204
2007/0275738 A1 11/2007 Hewes
2007/0287477 A1* 12/2007 Tran ............................ 455/466
2008/0002726 A1* 1/2008 Haung et al. ................. 370/401
2008/0151050 A1* 6/2008 Self ............................. 348/143
2008/0182563 A1 7/2008 Wugofski
2009/0047992 A1* 2/2009 Ortiz et al. ................ 455/552.1
2009/0258659 A1* 10/2009 Kim et al. ................. 455/456.3

OTHER PUBLICATIONS

Marek, S., Mobile Marketing: Beyond SMS, WirelessWeek, Nov. 1, 2006, Issue 14, Advantage Business Media, Rockaway, New Jersey.

* cited by examiner

*Primary Examiner*—Ajit Patel

(57) ABSTRACT

Described is a system for handling multimedia content with a wireless network. The concept is a cross-carrier mobile social network and promotional platform for submitting content (e.g., photos, videos, and/or audio) taken with a camera phone to the Internet via short code. By combining mobile messaging, short codes, MMS, camera phone, email and Internet technologies, this solution offers camera phone enthusiasts a simple, fun and easy way to upload multimedia content to social networks, a variety of world wide web destinations, as well as participate in promotional events.

20 Claims, 11 Drawing Sheets

CROSS-CARRIER CONTENT UPLOAD, SOCIAL NETWORK AND PROMOTIONAL PLATFORM

RELATED APPLICATIONS

This patent claims priority to U.S. Provisional Application No. 60/896,791 filed on Mar. 23, 2007 and entitled Cross-Carrier Image Upload and Social Network. This application is a Continuation of pending U.S. patent application Ser. No. 12/049,748 filed 17 Mar. 2008, entitled CROSS-CARRIER CONTENT UPLOAD, SOCIAL NETWORK AND PROMOTIONAL PLATFORM, in the name of Jeffrey M. Franklin.

BACKGROUND

Mobile devices with integrated media capturing components have become ubiquitous. One common example is a digital camera integrated in a cellular telephone. Another example is a handheld personal digital assistant with an integrated voice recorder. Many people today take advantage of these devices with greater adoption every day.

One problem with these devices is that it can be difficult or cumbersome to extract the content once it has been captured. For example, many users have difficulty accessing images captured using a digital camera integrated into a cellular phone. A common technique used to access those images may be to send a multimedia message (including, but not limited to photos, videos, audio or other enhanced multimedia content) from the user's cellular phone to the user's e-mail account. This technique enables a user to merely extract the images stored on the mobile device, but it does not provide the user with any meaningful mechanism to use or share the images.

Another technique that has evolved recently is the ability for a user to transmit an image to a content destination maintained by the user's cellular service provider (the "carrier"). One example of this technique is embodied in the "Pix Place" service offered by Verizon Wireless, Inc. With this technique, the carrier essentially offers its subscribers the ability to send and receive multimedia messages between cellular phones. However, the service is available only to the carrier's subscribers. Subscribers of other carriers cannot avail themselves of the service. The Pix Place service allows subscribers of a limited number of other carriers certain fundamental usage of the service, such as merely transmitting or receiving multimedia messages to or from the service subscribers.

The inventor has identified a lack in the industry of a cross-carrier multimedia destination. Such a destination, if it existed, could enable previously-unknown services, such as enhanced techniques for sharing multimedia content and monetizing that content.

SUMMARY

The invention is directed at handling multimedia content with a wireless network. The concept is a cross-carrier mobile social network and promotional platform for submitting content (e.g., photos, videos, and/or audio) taken with a camera phone to the Internet via short code. By combining mobile messaging, short codes, MMS, camera phone, email and Internet technologies, this solution offers camera phone enthusiasts a simple, fun and easy way to post and share photos via the world wide web.

DETAILED DESCRIPTION OF ILLUSTRATIVE NON-LIMITING EMBODIMENTS

Briefly stated, embodiments of the invention include a destination that receives multimedia content transmitted from a subscriber's mobile device. In certain implementations, the destination allows network access to the content, such as over the Internet. The destination can be configured to further communicate the multimedia content to other subscribers or non-subscribers. Similar access to the destination is available to subscribers of multiple carriers. Additional services based on the multimedia content may also be made available through or in conjunction with the destination. Multimedia content may also be delivered to other destinations for use as defined by the operating entity.

Figure 1:
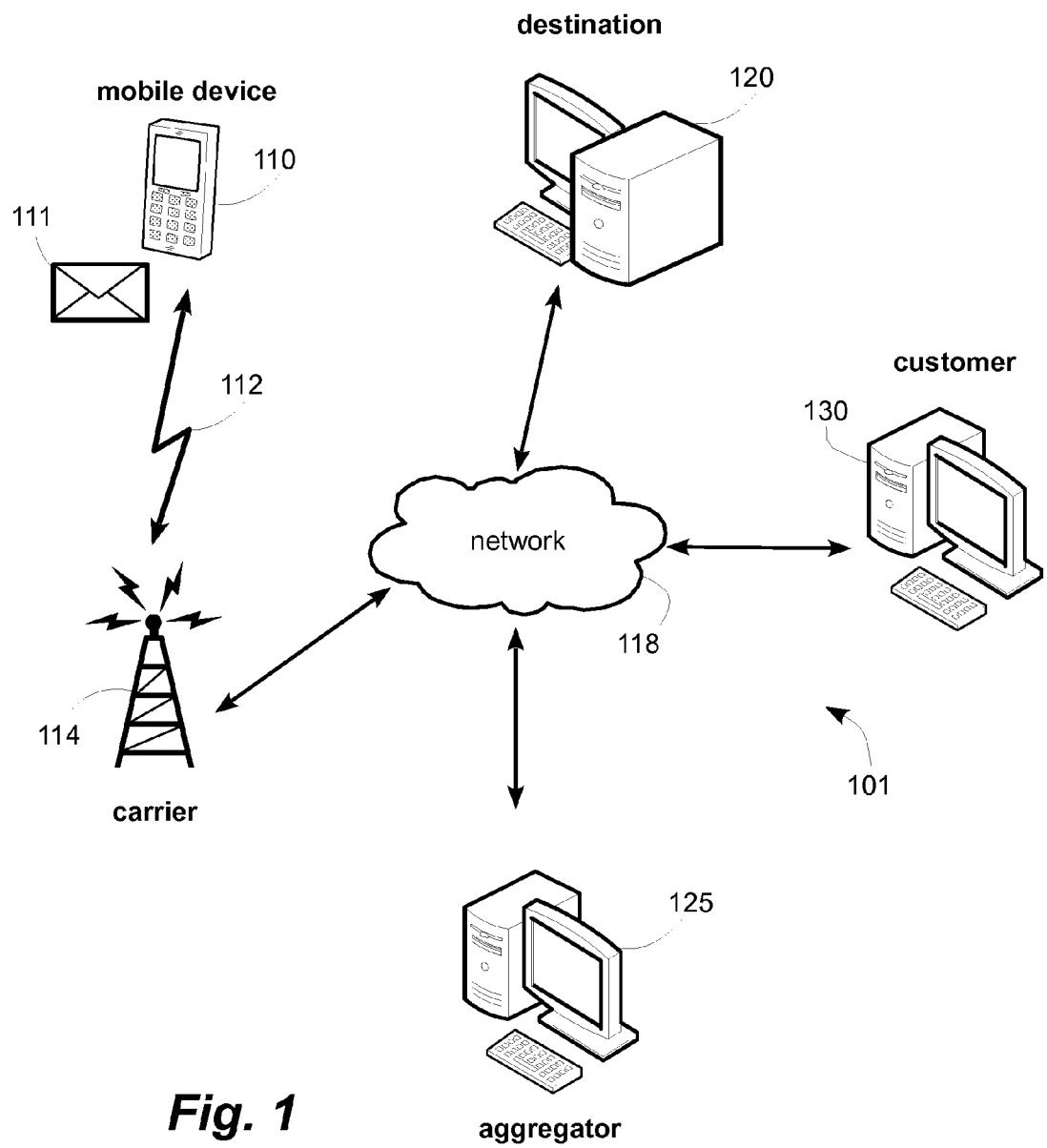
FIG. 1 is a conceptual overview of a communication system 101 implementing one embodiment.

FIG. 1 is a conceptual overview of a communication system 101 implementing one embodiment. In this implementation, the communication system 101 facilitates communication between a mobile device 110 and other devices over a wireless network 112. More specifically, in this implementation the mobile device 110 communicates with at least a multimedia content destination ("destination") 120 using the wireless network 112. The mobile device 110 may additionally communicate with other mobile devices (not shown) over the wireless network 112, perhaps in conjunction with other networks. The multimedia content mobile device 110 transmits may also be delivered to another destination via wireless network 120, the public Internet or a private connection. The other networks may be either wireless, wired, or various combinations of the two.

Example Components of Described System

The general operation of the system 101 will be described here. After this general description, a brief description of each component of the system will be provided next in conjunction with FIG. 2. Certain of the components will be described in greater detail as set forth more fully below.

Generally stated, the mobile device 110 communicates with other devices over a wireless network 112. In one example, the wireless network 112 is a cellular telephone network provided by a carrier 114. In other examples, the wireless network 112 could be a WiFi network or a WiMax network, or other form of wireless communication. Each of the components of the communication system 101 will be briefly described here, with certain components described in greater detail below.

The mobile device 110 is a portable device that is capable of wireless communication and of capturing multimedia content. In one example, the mobile device 110 may be a cellular telephone. Other examples include a PDA, a laptop computer, a WiFi telephone, a digital still camera, digital video camera, or the like. The mobile device 110 may be configured to capture one or more types of multimedia content such as still images, video, audio, and/or any combination of these. For the purpose of this document, the term "content" will be used to describe multimedia content in any form or combination of forms. The mobile device 110 is also configured to transmit the multimedia content over the wireless network 112 to a receiving device. In one example, the mobile device 110 is configured to transmit a multimedia message 111 (such as, but not limited to, a Short Messaging Service (SMS) or Multimedia Messaging Service (MMS) message).

A carrier 114 enables wireless communication between the mobile device 110 and other devices. In one example, the carrier 114 is a cellular service provider that enables wireless communication between the mobile device 110 and other mobile devices on the wireless network. In addition, the carrier 114 couples the mobile device 110 to another network 118, which may be another wireless network, a wired network, or some combination of these. The network 118 may incorporate publicly accessible networks, such as the Internet, and privately accessible networks. The carrier 114, through the network 118, enables communication between the mobile device 110 and other devices, such as a destination 120 and a customer 130 or other destinations. The carrier 114 further enables the transmission of multimedia messages to a unique address, such as a Common Short Code or "short code", that identifies a recipient for those messages. An aggregator 125 may be used by the carrier 114 to facilitate transmitting messages addressed to a common, cross-carrier short code.

Multiple carriers may be configured to transmit messages from their respective subscribers to the same short code. Short codes are known in the art. However, as is known in the art, different mobile devices are typically configured to communicate only with their affiliated carrier and not directly with another carrier. Each of multiple carriers typically use incompatible communications protocols which make direct communication between the infrastructure of one carrier with mobile devices of another carrier. For instance, mobile devices configured to communicate over a CDMA cellular network may not communicate with another carrier's cellular infrastructure based on the GSM standard. In other cases, the limitation is imposed artificially by different carriers. For example, one carrier may "lock" mobile devices that are initially purchased for use on its network in order to prevent the mobile devices from being used on other compatible but competing networks.

The destination 120 includes computing equipment and services that are configured to receive multimedia messages, such as message 111, and to post the multimedia content of those messages to a network-accessible location. The destination 120 is further configured to perform additional operations based on configuration options under the control of a user, such as the user of the mobile device 110. The destination 120 is accessible by other computing devices over the network 118, and may be accessed by the user with a conventional computing system or a mobile device that is capable of interacting with remote computing devices. Examples of the additional operations that may be performed by the destination 120 include transmitting the multimedia content to recipients designated by the user, transmitting a notice of the message to recipients designated by the user, forwarding the multimedia content to a customer 130 of the destination 120, reconstituting the content in another format and transmitting the reconstituted content to recipients designated by the user, or the like.

In operation, a user of the mobile device 110 may capture content, such as an image, video, or audio clip. The user may compose a multimedia message 111 incorporating the content and transmit the message 111 to a short code. The carrier 114 identifies the message 111 as being addressed to a short code and passes that message 111 to the aggregator 125 for delivery. The aggregator 125 identifies the destination 120 as the target of the short code and delivers the message 111 to the destination 120. Once received, the destination 120 extracts the content from the message 111 and operates on the content in accordance with the user's indicated desires. For example, the content may be posted to a network accessible location, such as a picture gallery. The content may be forwarded to recipients identified by the user. The content may be forwarded to a customer 120 of the destination. A notice that the message 111 arrived may alternatively (or additionally) be transmitted. Any combination of these or other operations may additionally be performed.

Multimedia messages may also contain additional information that would be delivered, stored and/or displayed. This information could be a physical address, subject/category tags, routing information or longitude & latitude provided by an individual or a GPS device, or GPS-enabled digital camera integrated in a cellular telephone.

The foregoing discussion provides a general overview of how components of the system 101 interact. A more detailed discussion of the interaction of the components and their respective functions will now be presented in conjunction with FIG. 2.

Figure 2:
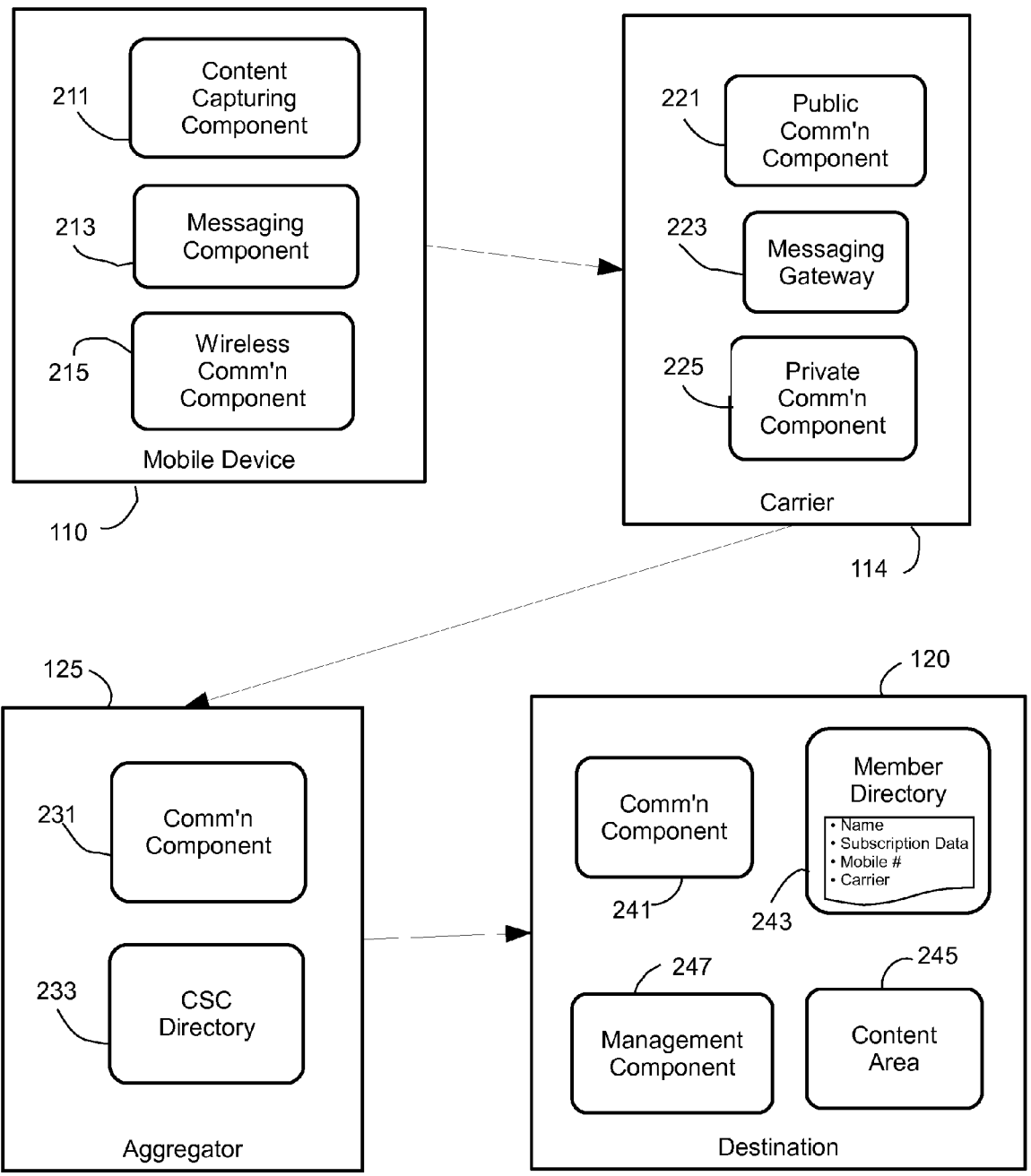
FIG. 2 is a functional block diagram illustrating in greater detail the components of the system introduced above in conjunction with FIG. 1.

FIG. 2 is a functional block diagram illustrating in greater detail the components of the system 101 introduced above in conjunction with FIG. 1. As shown, the mobile device 110 interfaces with the carrier 114, which interfaces with the aggregator 125, which in turn interfaces with the destination 120.

The mobile device 110 includes, in a basic form, a content capturing component 211, a messaging component 213, and a wireless communication component 215. Generally stated, the content capturing component 211 performs the task of capturing multimedia content. In one example, the content capturing component 211 may be implemented as an integrated digital camera for capturing images or video. In another example, the content capturing component 211 may be implemented as audio capturing equipment, such as a microphone and recording components. Combinations of these are also likely, such as both video and audio capturing components for capturing video with sound.

The messaging component 213 performs the task of composing and transmitting messages, including multimedia messages. In one example, the messaging component 213 may be implemented as a Short Messaging Service (SMS) and/or Multimedia Messaging Service (MMS) client. The messaging component 213 is configured to accept addresses from a user of the mobile device 110 in the form of a short code. Short codes can take any arbitrary form, although typically short codes are between 5 and 6 numerals in length. In addition, the messaging component 213 may be configured to resolve addresses from an alias provided by the user to a longer address, such as may be stored in a contacts list or the like. In such a case, a short, easily-remembered alias could be used to identify an address for an intended recipient.

The basic functional components of a conceptual mobile device have been described here generally. One particular implementation of a mobile device that may be used in various embodiments is described in greater detail below in conjunction with FIG. 4.

The carrier 114 represents the mobile device's access point to communication with other components. In many embodiments, the carrier 114 may be the mobile device's wireless service provider, such as a cellular service provider. However, in other embodiments the carrier 114 may be implemented as a non-cellular wireless provider. Examples include a wide-area wireless Ethernet service provider, such as a WiMax service provider. Another example may be a public or private local area wireless service provider, such as a WiFi access point.

In its basic form, the carrier 114 includes a public communication component 221, which supports wireless communication with the carrier's subscribers. For example, the public communication component 221 may be implemented as a wireless communication network based on CDMA, GSM, TDMA, PCS or other wireless communication technology. Alternatively, the public communication component 221 may implement a wireless Ethernet technology, such as the IEEE 802.11 standards, Wi-Fi, Wi-Max, or some other wireless communication standard, such as Bluetooth. Generally stated, the public communication component 221 provides wireless network connectivity to the mobile device.

The carrier 114 also includes a private communication component 225, which operates to provide communication between the carrier 114 and selected entities which the carrier 114 trusts. The private communication component 225 need not be a wireless communication, but is preferably a secure connection between the carrier 114 and selected entities. In one example, the private communication component 225 supports Virtual Private Network connectivity between the carrier 114 and business partners of the carrier 114 (e.g., aggregator 125) that have a demonstrated need for access to portions of the carrier's network that are inaccessible using the public communication component 221.

The carrier 114 further includes a messaging gateway 223 that operates to route messages, such as SMS and/or MMS messages, to their intended destinations. Commonly, the messaging gateway 223 examines an inbound message and determines an appropriate route for the message. In one example, the messaging component 223 is configured to determine that a message has been addressed to a short code, and to determine an appropriate destination for the message. In this example, the messaging component 223 may determine an appropriate aggregator (i.e., aggregator 125) that is registered to handle messages directed to particular short codes. Accordingly, any message received by the messaging component 223 addressed to a short code for which the aggregator 125 is registered is forwarded to that aggregator for handling.

The aggregator 125 represents a component for routing messages addressed to a short code to their intended destination. The aggregator 125 includes a communication component 231 and a CSC directory 233. The communication component 231 supports communication between the aggregator 125 and other entities, such as the carrier 114 and the destination 120 or another destination. The CSC directory 233 includes information that associates particular short codes with routing information for service providers (e.g., destination 120) that act as the target for messages addressed to those short codes. In one example, one or more short codes may be associated with the destination 120, indicating that messages addressed to those one or more short codes should be routed to the destination 120 or another destination.

Although illustrated as being connected to a single carrier 114, it should be noted that the aggregator 125 likely includes multiple similar connections to other carriers (not shown), and performs similar functions on behalf of those other carriers. Alternatively, the aggregator 125 may interact with other aggregators which are connected to other carriers to accomplish similar functions. In this manner, a similar short code can be used to route messages that originate in subscriber networks of various carriers to the same destination, thus making the operations described here cross-carrier.

The destination 120 represents the destination for a multimedia message. The destination 120 may be addressed using a particular short code or codes, an e-mail address, a telephone number, a URL or URI, an IP address, or the like. In this implementation, the destination 120 includes a communication component 241, a member directory 243, a content area 245, and a management component 247. Other embodiments could be implemented with less or more that those components described here. Although described briefly here, the destination 120 is described in greater detail below in conjunction with FIG. 3.

The communication component 241 enables interactive communication between the destination 120 and other computing devices or systems, such as the aggregator 125, the carrier, and/or a customer (not shown). The communication component 120 may be wired or wireless and is configured to support interactive communications with other computing devices over a publicly-accessible network, such as the Internet, and/or a privately-accessible network, such as a VPN or the like.

The member directory 243 is a data store that houses information about users that are authorized to use the features made available by the destination 120 or another destination. Many different forms of information may be stored in the member directory 243, such as a user's name, subscription data that describes information about the user's relationship with the destination 120 (e.g., access rights, payment status, etc.), a unique identifier for the user (e.g., a mobile phone number or MIN, electronic serial number or ESN, e-mail address, or the like), the user's carrier, and any other information that the implementation may warrant. In some circumstances the destination 120 may be implemented without a member directory 243, such as in the case where users do not subscribe to the service but rather take advantage of a promotion or the like.

A content area 245 is a data store that is publicly accessible. The content area 245 may be used to store multimedia content received in a multimedia message. The content area 245 may be partitioned in an appropriate manner to provide a certain amount of storage space to one or more users. The amount of storage could be based on subscription data for the users, or perhaps some default amount of storage. A user's portion of the content area 245 may be publicly accessible but protected in some fashion, such as by login credentials or the like. Access to the content area 245 could be configurable by the user, such as allowing open access to everyone, limited access to everyone and less restricted or unlimited access to an identified few users, unlimited access only to an identified few users, or access by only one user. Alternatively, the content area 245 could be accessible only in a limited capacity (e.g., 'read only') to everyone or only to registered users.

The management component 247 includes logic to control the interaction of the destination 120 with other computing devices, to administer the locally-stored data and configuration settings, and to generally control the operation of the destination 120. The management component 247 may include its own configuration and operating data, as well as access external data and systems to facilitate the operation of the destination 247. Although generally described here, more particular functionality that may be implemented in the management component 247 is described below in conjunction with FIG. 3.

Figure 3:
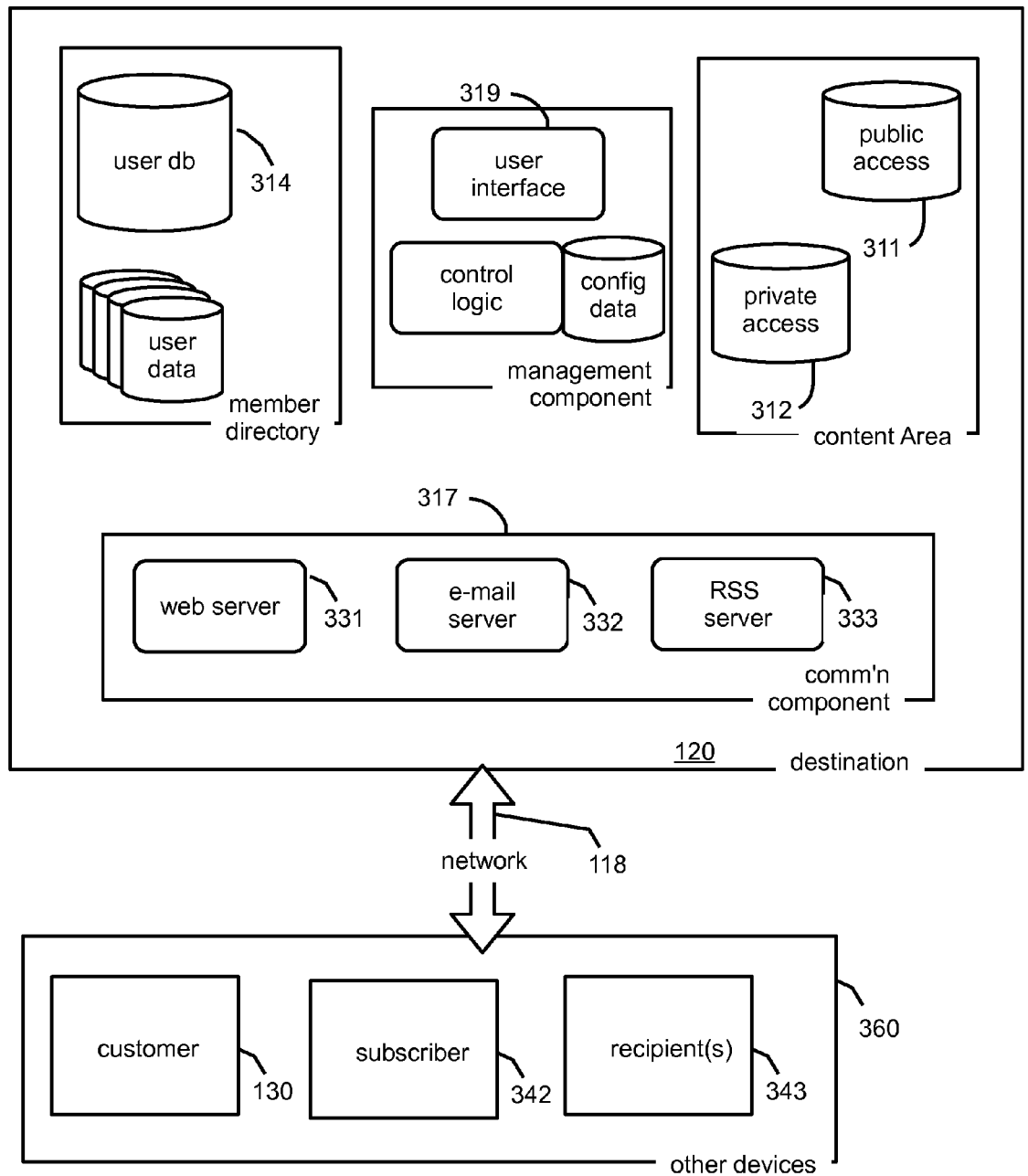
FIG. 3 is a functional block diagram illustrating in slightly greater detail the destination introduced above in conjunction with FIGS. 1 and 2.

FIG. 3 is a functional block diagram illustrating in slightly greater detail the destination 120 introduced above in conjunction with FIGS. 1 and 2. In this implementation, the destination 120 includes the communication component 241, member directory 243, content area 245, and management component 247 introduced above.

In this implementation, the communication component 241 further includes a web server, an e-mail server, and an RSS server. These components enable the destination to communicate with other devices, such as other devices 360.

The member directory 243 further includes a user database with information about each subscribed user, and user data with information stored and maintained by the individual subscribed users.

The content area 245 further includes a publicly accessible network storage location, and a privately accessible storage location.

The management component 247 further includes a user interface, a configuration data store, and control logic. The control logic includes executable instructions for controlling the various operations performed by the destination.

Also illustrated in FIG. 3 are other devices 360 that may access the destination over a network 320. The other devices include a customer 341, subscriber 342, and recipients 343.

Figure 4:
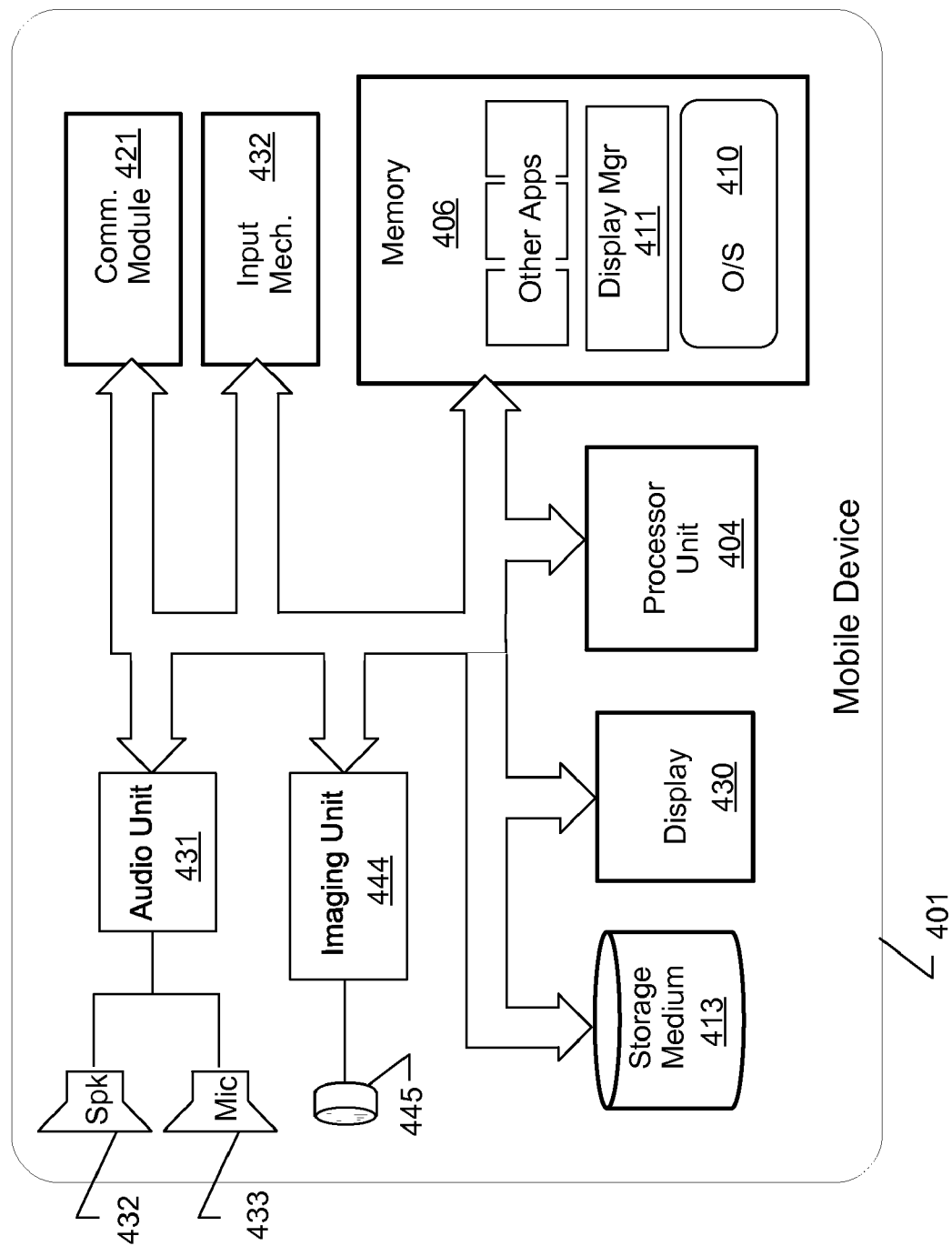
FIG. 4 is a functional block diagram of a sample mobile device that may be configured for use in certain implementations of the disclosed embodiments or other embodiments.

FIG. 4 is a functional block diagram of a sample mobile device 401 that may be configured for use in certain implementations of the disclosed embodiments or other embodiments. The mobile device 401 may be any handheld computing device and not just a cellular phone. For instance, the mobile device 401 could also be a mobile messaging device, a personal digital assistant, a portable music player, a global positioning satellite (GPS) device, a digital still camera, digital video camera, or the like. Although described here in the context of a handheld mobile phone, it should be appreciated that implementations of the invention could have equal applicability in other areas, such as conventional wired telephone systems and the like.

In this example, the mobile device 401 includes a processor unit 404, a memory 406, a storage medium 413, an audio unit 431, an input mechanism 432, and a display 430. The processor unit 404 advantageously includes a microprocessor or a special-purpose processor such as a digital signal processor (DSP), but may in the alternative be any conventional form of processor, controller, micro-controller, state machine, or the like.

The processor unit 404 is coupled to the memory 406, which is advantageously implemented as RAM memory holding software instructions that are executed by the processor unit 404. In this embodiment, the software instructions stored in the memory 406 include a display manager 411, a runtime environment or operating system 410, and one or more other applications 412. The memory 406 may be on-board RAM, or the processor unit 404 and the memory 406 could collectively reside in an ASIC. In an alternate embodiment, the memory 406 could be composed of firmware or flash memory.

The storage medium 413 may be implemented as any non-volatile memory, such as ROM memory, flash memory, or a magnetic disk drive, just to name a few. The storage medium 413 could also be implemented as a combination of those or other technologies, such as a magnetic disk drive with cache (RAM) memory, or the like. In this particular embodiment, the storage medium 413 is used to store data during periods when the mobile device 401 is powered off or without power. The storage medium 413 could be used to store contact information, images, call announcements such as ring tones, and the like.

The mobile device 401 also includes a communications module 421 that enables bi-directional communication between the mobile device 401 and one or more other computing devices. The communications module 421 may include components to enable RF or other wireless communications, such as a cellular telephone network, Bluetooth connection, wireless local area network, or perhaps a wireless wide area network. Alternatively, the communications module 421 may include components to enable land line or hard wired network communications, such as an Ethernet connection, RJ-11 connection, universal serial bus connection, IEEE 1394 (Firewire) connection, or the like. These are intended as non-exhaustive lists and many other alternatives are possible.

The audio unit 431 is a component of the mobile device 401 configured to convert signals between analog and digital format. The audio unit 431 is used by the mobile device 401 to output sound using a speaker 432 and to receive input signals from a microphone 433. The speaker 432 could also be used to announce incoming calls.

The imaging unit 444 is a component of the mobile device 401 configured to capture and process digital images in conjunction with an optical device 445. The imaging unit 444 and the optical device 445 may be implemented as a CCD camera, in one example.

A display 430 is used to output data or information in a graphical form. The display could be any form of display technology, such as LCD, LED, OLED, or the like. The input mechanism 432 may be any keypad-style input mechanism. Alternatively, the input mechanism 432 could be incorporated with the display 430, such as the case with a touch-sensitive display device. Other alternatives too numerous to mention are also possible.

Certain of the components described above may be implemented using general computing devices. To avoid confusion, the following discussion provides an overview of one implementation of such a general computing device that may be used to embody one or more components of the system described above.

Figure 5:
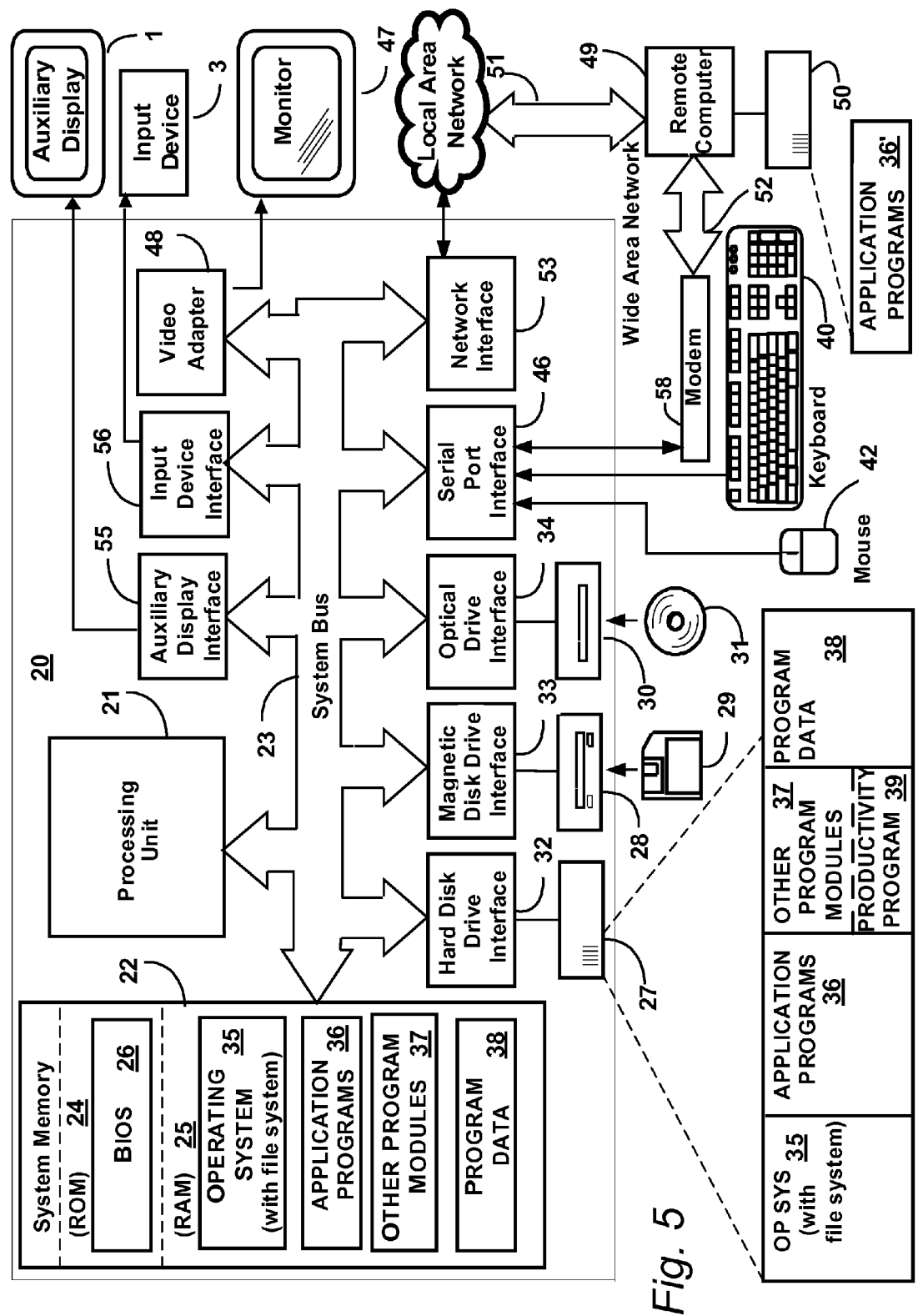
FIG. 5 is a block diagram representing a computing device in the form of a general purpose computer system with which embodiments of the present invention may be implemented.

FIG. 5 is a block diagram representing a computing device 520 in the form of a general purpose computer system with which embodiments of the present invention may be implemented. Those skilled in the art will appreciate that the general purpose computer system 520 depicted is intended to be merely illustrative and that the present invention may be practiced with other computer system configurations, including hand-held devices, multi-processor systems, microprocessor-based or programmable consumer electronics, network PCs, minicomputers, mainframe computers, headless servers and the like. Embodiments may also be implemented in distributed computing environments where tasks are performed by remote processing devices that are linked through a communications network. In a distributed computing environment, program modules may be located in both local and remote memory storage devices.

The general purpose computer system 520 includes a processing unit 521, a system memory 522, and a system bus 523 that couples various system components including the system memory to the processing unit 521. The system bus 523 may be any of several types of bus structures including a memory bus or memory controller, a peripheral bus, and a local bus using any of a variety of bus architectures. The system memory includes read-only memory (ROM) 524 and random access memory (RAM) 525. A basic input/output system 526 (BIOS), containing the basic routines that help to transfer information between elements within the personal computer 520, such as during start-up, is stored in ROM 524. The personal computer 520 may further include a hard disk drive 527 for reading from and writing to a hard disk, not shown, a magnetic disk drive 528 for reading from or writing to a removable magnetic disk 529, and an optical disk drive 530 for reading from or writing to a removable optical disk 531 such as a CD-ROM or other optical media. The hard disk drive 527, magnetic disk drive 528, and optical disk drive 530 are connected to the system bus 523 by a hard disk drive interface 532, a magnetic disk drive interface 533, and an optical drive interface 534, respectively. The drives and their associated computer-readable media provide non-volatile storage of computer-readable instructions, data structures, program modules and other data for the personal computer 520. Although the exemplary computer system described herein employs a hard disk, a removable magnetic disk 529 and a removable optical disk 531, it should be appreciated by those skilled in the art that other types of computer-readable media which can store data that is accessible by a computer, such as magnetic cassettes, flash memory cards, digital video disks, Bernoulli cartridges, random access memories (RAMs), read-only memories (ROMs) and the like may also be used in the exemplary computer system.

A number of program modules may be stored on the hard disk, magnetic disk 529, optical disk 531, ROM 524 or RAM 525, including an operating system 535, one or more application programs 536, other program modules 537, and program data 538. A user may enter commands and information into the personal computer 520 through input devices such as a keyboard 540 and pointing device 542. Other input devices (not shown) may include a microphone, joystick, game pad, satellite dish, scanner or the like. These and other input devices are often connected to the processing unit 521 through a serial port interface 546 that is coupled to the system bus, but may be connected by other interfaces, such as a parallel port, game port or universal serial bus (USB). A monitor 547 or other type of display device is also connected to the system bus 523 via an interface, such as a video adapter 548. In addition to the monitor 547, personal computers typically include other peripheral output devices, such as auxiliary display 501 or speakers and printers (not shown). Auxiliary display 501 is an additional output device connected to the system bus 523 via auxiliary display interface 555, which may be a video adapter, USB or other peripheral device connection. The input device 503 for controlling the auxiliary display 501 is connected to the system bus 523 via input device interface 556, which may be a serial interface, USB or other peripheral device connection.

The personal computer 520 may operate in a networked environment using logical connections to one or more remote computers, such as a remote computer 549. The remote computer 549 may be another personal computer, a server, a router, a network PC, a peer device or other common network node, and typically includes many or all of the elements described above relative to the personal computer 520. The logical connections depicted in FIG. 5 include a local area network (LAN) 551 and a wide area network (WAN) 552. Such networking environments are commonplace in offices, enterprise-wide computer networks, Intranets and the Internet.

When used in a LAN networking environment, the personal computer 520 is connected to the local area network (LAN) 551 through a network interface card or adapter 553. When used in a WAN networking environment, the personal computer 520 may include a modem 558 or other mechanism for establishing communications over the wide area network (WAN) 552, such as the Internet. The modem 558 or network interface 553 may be internal or external. An external unit may be connected to the system bus 523 via a peripheral connectivity bus, such as the serial port interface 546 or a USB interface.

In a networked environment, program modules depicted relative to the personal computer 520, or portions thereof, may be stored in the remote memory storage device. It will be appreciated that the network connections shown are exemplary and other means of establishing a communications link between the computers may be used and would include a virus detection device implemented in a similar or alternative embodiment as necessitated by the communications link.

Example Processes Performed by Disclosed System

The system(s) disclosed above may be implemented in various fashions to perform various operations to accomplish the teachings of this document. Many different processes may be developed to implement the various features and functions described above. What follows here is a sample of several processes that may be used to implement certain of the described features. The processes described here should not be viewed as an exhaustive list, but rather merely as guidance for the implementation of other processes.

Figure 6A:
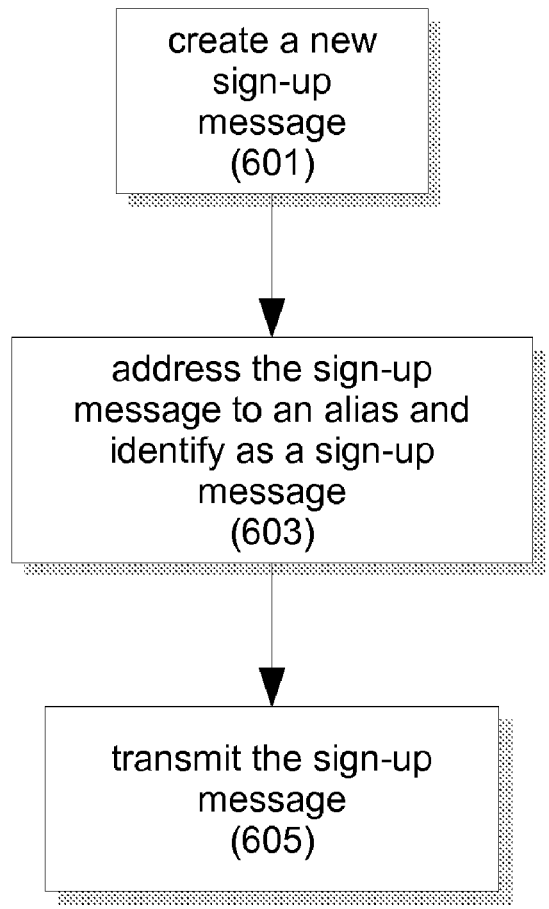
FIG. 6 is an operational flow diagram generally illustrating steps performed by a process for registering a user with an image destination, in accordance with one embodiment.
Figure 6B:
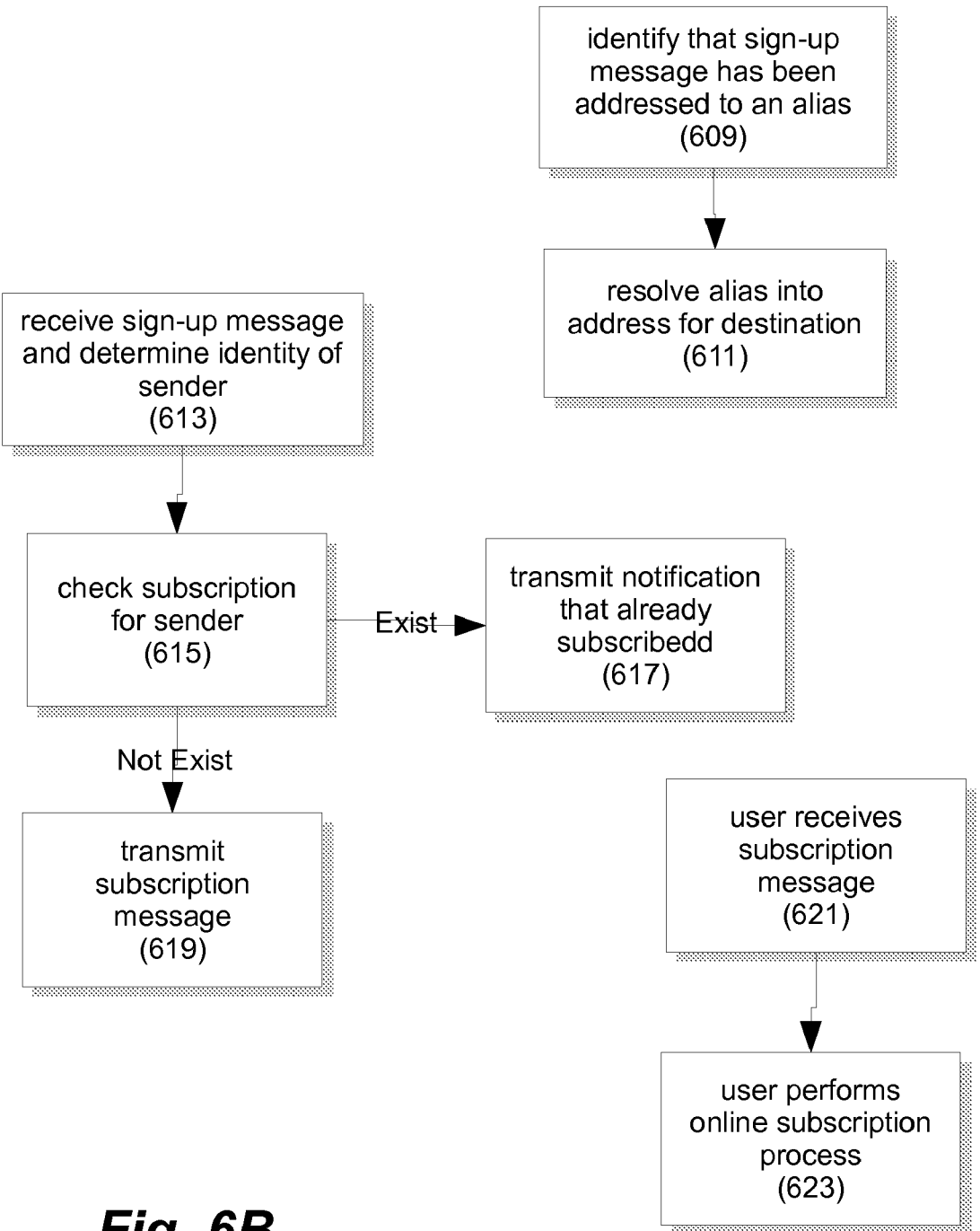

FIG. 6 is an operational flow diagram generally illustrating steps performed by a process for registering a user with an image destination service, in accordance with one embodiment. The process illustrated in FIG. 6 may be performed in the context of a user that desires to post multimedia content captured with or resident on the user's mobile device. In many implementations, but not all, the system may require the user to register with a destination prior to allowing content to be uploaded. The process illustrated in FIG. 6 and described here is but one example of many different implementations for such a process.

The operations of process 600A are generally performed on a mobile device, such as a cellular telephone. Many operations other than those enumerated here may also be performed, although the steps here are viewed as the minimal for certain implementations. In other implementations, fewer or more steps may be performed.

At step 601, a user creates a new sign-up message. The sign-up message may take any one or more of various forms. For instance, the sign-up message may be an SMS text-based message, an MMS message, an e-mail message, an instant message, WAP-based form or the like.

At step 603, the user addresses the sign-up message to an alias or short code affiliated with the destination, and enters the appropriate content to identify the message as a sign-up message. In one example, the user may enter the word "Content" in the subject line of the sign-up message. In another example, the user may enter the word "Sign-up." The particular content entered is unimportant so long as it identifies the message as a sign-up message in some fashion.

In certain implementations, attaching multimedia content to the message if the user is not already registered may be construed as the multimedia message being a sign-up message. Accordingly, an ordinary multimedia message may be treated as a sign-up message even in the absence of an explicit indicator to that effect.

At step 605, the mobile device transmits the sign-up message using the user's carrier network. In most implementations, but not all, the user's carrier network is a wireless cellular communications network. In other implementations, the user's carrier network may be an alternative to cellular communications, such as WiFi or WiMax.

The operations of process 600B may be performed variously by any one or more components, such as the user's carrier, the destination, the aggregator, or the like. Certain operations will be described below as being performed by certain named components. However, it should be appreciated that the particular assignments of responsibility for performing operations is a design choice, and the operations described may be performed by components other than those described here without deviating from the spirit of the process.

At step 609, the carrier identifies that the sign-up message has been addressed to an alias (e.g., a short code) that an aggregator is registered to handle. Accordingly, the carrier passes the sign-up message to the aggregator registered to handle that alias.

At step 611, the aggregator resolves the alias into a unique address for a destination entity—the "destination" in this example. In other words, the destination is registered with the aggregator as the destination of the alias to which the sign-up message is addressed. In one example, the alias is a short code that resolves into a destination address accessible over the Internet, such as an e-mail address or an IP address. The aggregator then passes the sign-up message to the destination as the registered destination.

At step 613, the destination receives the sign-up message and determines the identity of the sender (i.e., the originating mobile device). This identification may be performed based on any one or more of several different criteria. For example, in cases where the originating mobile device is a cellular telephone, the MIN or ESN of the device could be used as the identifier. In cases where a mobile device is connected using a wireless Ethernet connection or the like, an IP address or MAC address of the originating device may be used. In still other cases, identification information may be embedded within the message itself, such as a username or an e-mail address. These and other alternatives will be apparent to those skilled in the art.

At step 615, the destination checks for the existence of a subscription for the sender. The destination may refer to a client database with information about subscribed users. In cases where the sender is already a subscriber, the destination may additionally check the status of the sender's subscription, e.g., is the sender's billing current, and the like.

At step 617, if the sender is already registered, an appropriate notification to that effect may be transmitted to the sender. The message may be addressed to a reply-to address or, in the case of an SMS or MMS message, to the sender's mobile phone number as identified in the message. The reply notification may include the sender's subscription status, such as current, late billing, terminated, or the like.

At step 619, if the destination determines that the sender is unregistered, it may return an appropriate notification to that effect. In one example, the destination may return a message that states: "You are not registered yet. Click the attached link to register from your wireless device or computer." The destination may include in the notification a hyperlink or other address (e.g., URL or URI) that points to a utility for creating a new subscription or reviewing the details of an existing subscription or registration.

At step 621, the user that originated the sign-up message (the sender) receives the reply message from the destination. In the case where the reply message merely includes a notice that the user is already subscribed, operation may be terminated. In the case that the user is provided with sign-up information (e.g., a link) the user may be prompted to sign-up.

At step 623, the user performs an online sign-up process to create a new subscription (and/or account registration, new user and the like). The user may be prompted for subscription information, which is stored by the destination in its membership database. In one embodiment, the sign-up process may be implemented as an online web form that is accessible using network connectivity of the mobile device. In another embodiment, the sign-up process may be accessible preferably by using a general purpose computer over the Internet.

It should be noted that the registration process illustrated in FIG. 6 may be optional in various embodiments. For example, in some cases, such as a promotion or other marketing campaign, registration may be unnecessary. In such cases, registration may be omitted altogether.

Figure 7:
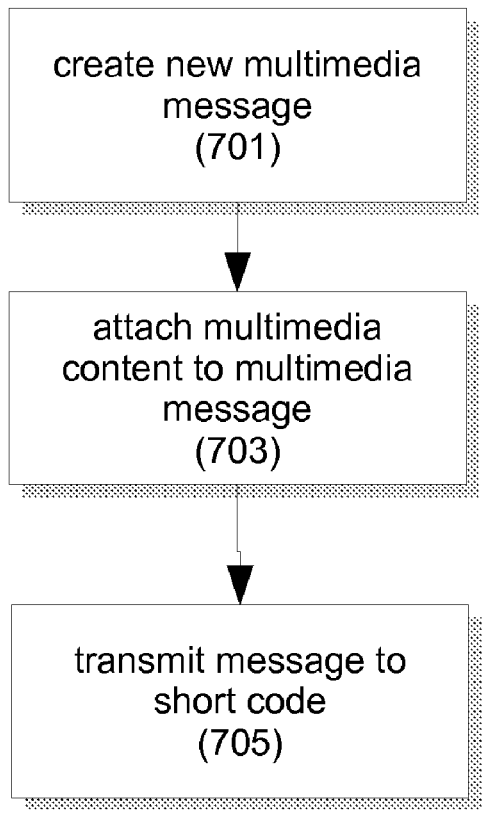
FIG. 7 is an operational flow diagram generally illustrating steps performed by a process for uploading multimedia content to a cross-carrier destination, in accordance with one embodiment.
Figure 7:
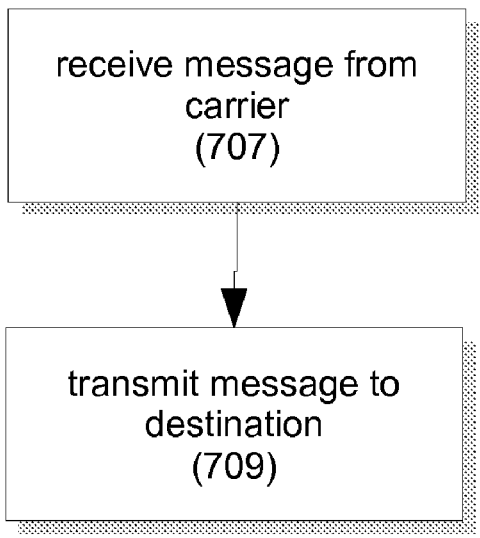

FIG. 7 is an operational flow diagram generally illustrating steps performed by a process for uploading multimedia content to a cross-carrier destination, in accordance with one embodiment. The process illustrated in FIG. 7 and described here is but one example of many different implementations for such a process.

Operations described here may be performed by the aggregator or by the destination, or by some combination of both entities. No significance should be assumed from the description of certain acts being performed either by the aggregator or the destination. Rather, the operations occur and may be implemented in part by the destination and in part by the aggregator, completely by the destination, completely by the aggregator, or in some other combination that differs from the particular assignments described here. As it is impossible to describe every conceivable combination and permutation of the divisions of labor, the reader is expected to understand that the various operations may be implemented using different components than those described here without deviating from the spirit of the implementation.

In the context of this process, a user is inclined to share multimedia content that has been captured on the user's mobile device. In one example, a user may have captured still images or video using integrated camera equipment and desire to share that content.

At step 701, the user creates a new multimedia message on the mobile device. The multimedia message may take any one or more of several forms, such as SMS, MMS, or e-mail. The user creates the new multimedia message using a messaging component of the mobile device, such as an SMS, MMS, or e-mail client.

At step 703, the user attaches the multimedia content to the new multimedia message. Different embodiments may be implemented using various technologies. For example, the multimedia message may be an MMS message to which the content is attached directly. In another example, the multimedia message may be an e-mail message to which the content is attached. In yet another example, an image could be attached to an SMS message. In still another example, a multimedia message could be sent with a link back to the image on the mobile device if the mobile device is addressable over the network.

At step 705, the mobile device transmits the message addressed to a short code or other alias. In one example, the alias is a Common Short Code or CSC. In another example, the mobile device may be populated with an alias (e.g., an easily remembered name, word, or series of numbers) that is resolved to a longer address, such as an e-mail address. Resolving the alias to the longer address could be performed either directly on the mobile device or at the aggregator (e.g., "alias to long-code" or "alias to e-mail"). Once the multimedia message has been transmitted, it flows through the extended network maintained, at least in part, by the user's carrier.

At step 707, the aggregator receives the message from the carrier and resolves the alias to a web address for the destination. In one example, the web address may be an e-mail address or an IP address for computing equipment under control of the destination. Other examples are also possible.

At step 709, the aggregator transmits the message to the destination at the address identified at step 707. For instance, the aggregator may forward the message as an e-mail message using e-mail protocols, or transmit the message to the destination using other Internet communication protocols or private communication protocols for data transfer.

Figure 8:
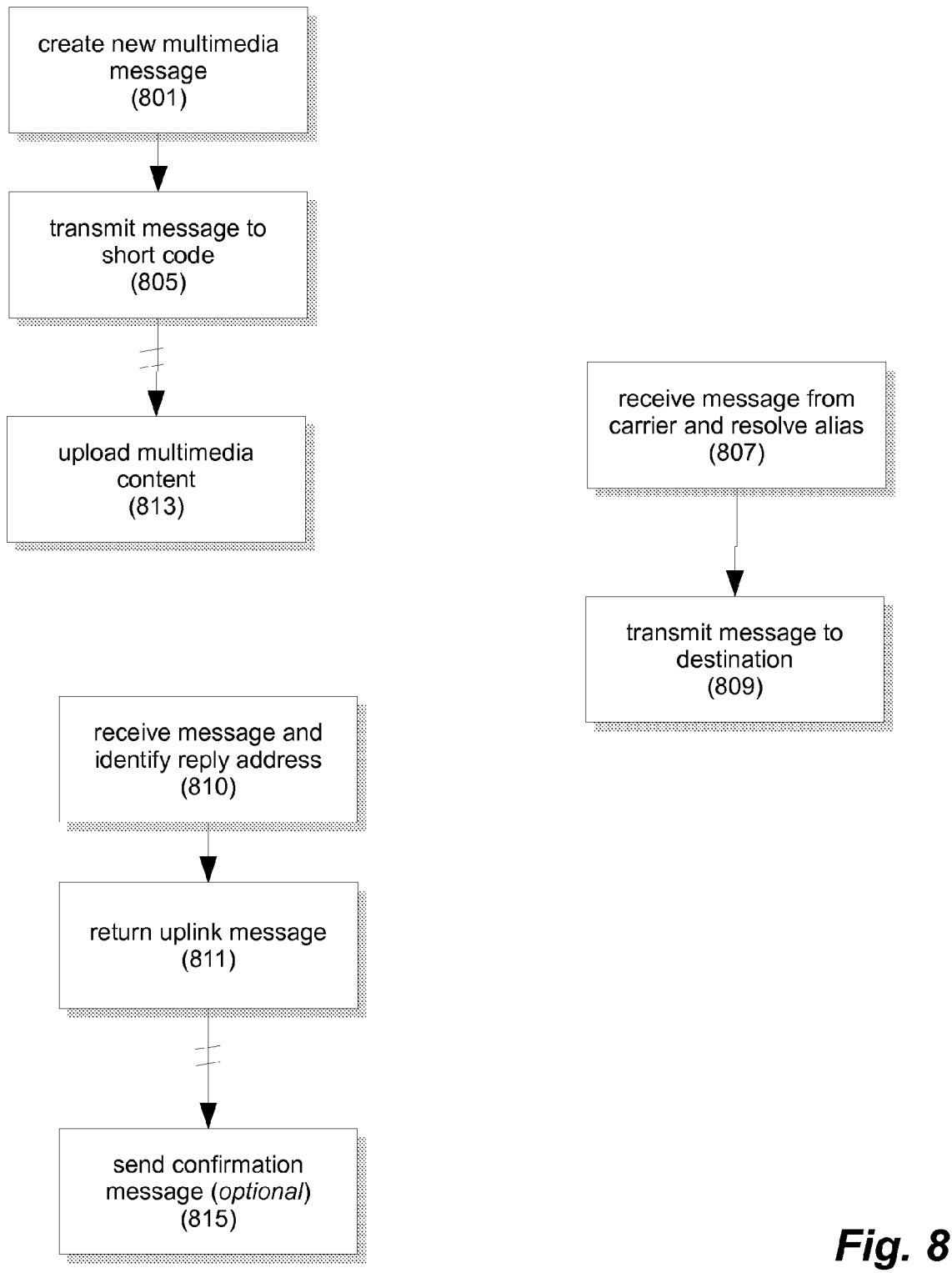
FIG. 8 is an operational flow diagram generally illustrating steps performed by an alternative process for uploading multimedia content to a cross-carrier destination, in accordance with one embodiment.

FIG. 8 is an operational flow diagram generally illustrating steps performed by another process for uploading multimedia content to a cross-carrier destination, in accordance with one embodiment. The process illustrated in FIG. 8 and described here is but one example of many different implementations for such a process. As with the process illustrated in FIG. 7, no significance should be given to the particular components described as implementing the particular operations. Rather, any component may be configured to implement any of these operations without deviating from the spirit of the implementation.

At step 801, the user creates a new multimedia message on the mobile device. The multimedia message may take any one or more of several forms, such as SMS, MMS, or e-mail. The user creates the new multimedia message using a messaging component of the mobile device, such as an SMS, MMS, or e-mail client.

In this particular implementation, unlike the process described above, the user includes a textual indicator that the user would like to upload content rather than the actual content. In one example, the user may include the trigger word "content" to indicate that the user desires to upload multimedia content.

At step 805, the mobile device transmits the message addressed to a short code or other alias. In one example, the alias is a Common Short Code or CSC. In another example, the mobile device may be populated with an alias (e.g., an easily remembered name, word, or series of numbers) that is resolved at the mobile device or aggregator to a longer address, such as an e-mail address. Once the multimedia message has been transmitted, it flows through the extended network maintained, at least in part, by the user's carrier.

At step 807, the aggregator receives the message from the carrier and resolves the alias to a web address for the destination.

At step 809, the aggregator transmits the message to the destination at the address identified at step 807. Again, unlike the earlier process, in this implementation the message does not include the multimedia content.

At step 810, the destination receives the multimedia message from the aggregator and identifies a reply address sufficient to issue a return message to the sender. In one example, the reply address may be the sender's originating MIN. Other examples are many.

At step 811, the destination sends an uplink message to the user at the reply address. The uplink message includes address information (e.g., a URL or URI) that points to a network location to which the user can upload the multimedia content.

At step 813, the user attaches and/or uploads the multimedia content to the uplink address identified in the uplink message. The content may be transferred to the upload location using a mobile device communication facility, such as a micro browser or the like.

At step 815, an upload confirmation message may be transmitted to the user, perhaps with a request to classify the content in some manner if desired (e.g., Sports, Humor etc.,).

Using the process illustrated in FIG. 8, the content may be delivered from the mobile device to the destination without in fact attaching the content to the multimedia message. This implementation may be appropriate in cases where there are limits that govern what data can be transmitted using the messaging capabilities of the mobile device and/or the carrier.

Figure 9:
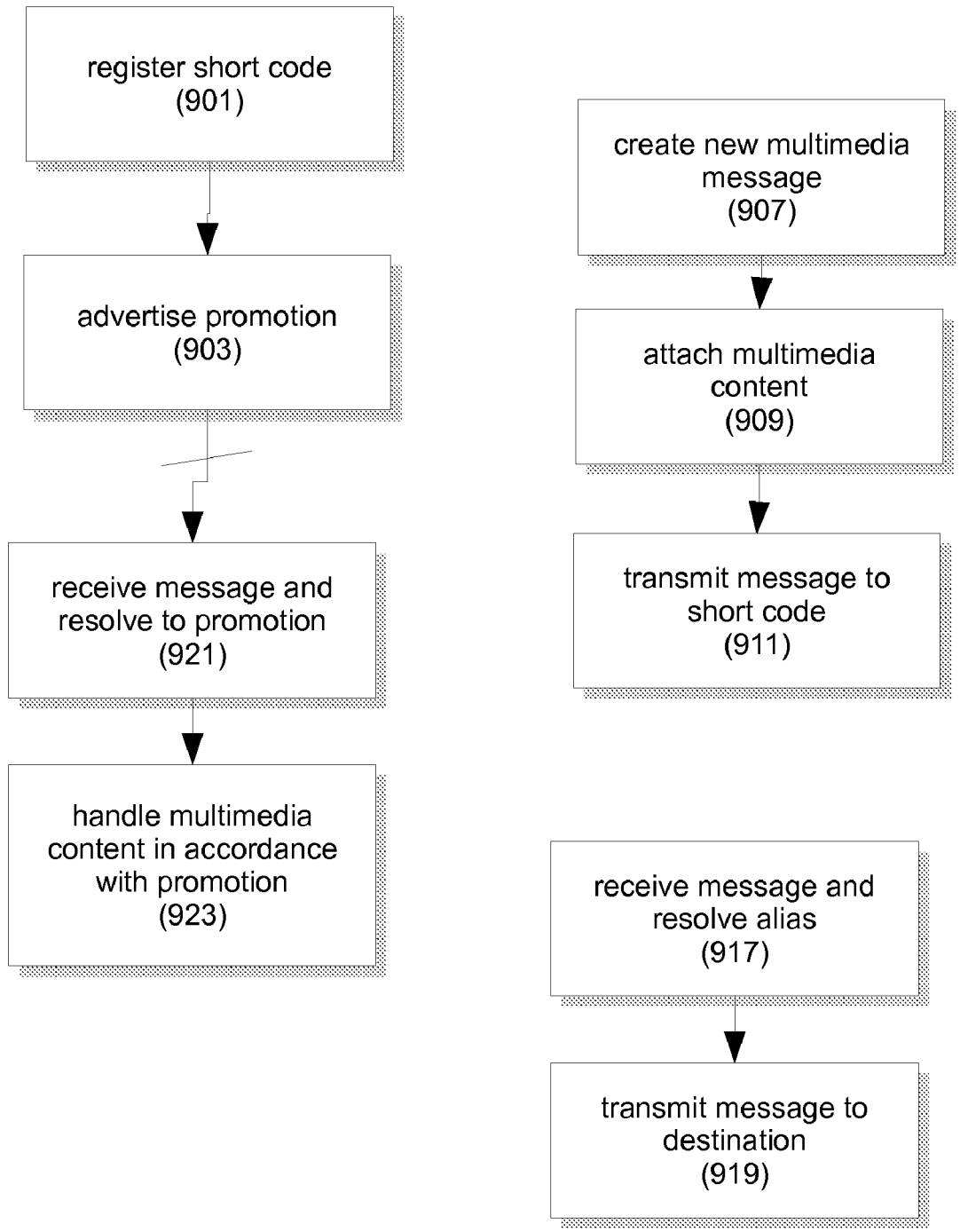
FIG. 9 is an operational flow diagram generally illustrating steps performed by a process for implementing a promotion or other advertising or marketing campaign.

FIG. 9 is an operational flow diagram generally illustrating steps performed by a process for implementing a promotion or other advertising or marketing campaign. In this operation, a business entity (or the like) conduct a promotion to generate interest in the entity's goods or services. Using an embodiment of the system described above, the entity can conduct such a promotion or social networking. The process illustrated in FIG. 9 and described here is but one example of many different implementations for such a process.

Certain operations of the process may be performed by different entities, although various operations may be merged together and performed by the same entity. In addition, the functions of certain operations may be divided among two or more entities. Accordingly, the guidance being offered by this illustrative process is focused on the functions being performed as the particular entities performing those functions may be different in different embodiments.

At step 901, a short code is registered with the appropriate registration authority, if required. In one example, a Common Short Code may be secured from the Common Short Code Authority (CSCA).

At step 903, the promotion is advertised in any appropriate manner. The advertisement may include the short code (or other alias) with instructions for the user to transmit a multimedia message to the short code. In one example, the advertisement may prompt users to send in pictures of their pets for a contest to the short code. Other examples are many.

At step 907, a user is inclined to participate in the promotion being advertised as described at step 903. Accordingly, the user creates a new multimedia message on a mobile device. In one example, a user of the mobile device may have captured multimedia content using the mobile device. The content may take any one or more of several different forms, such as still images, video, and/or audio. The multimedia message may take several forms, such as SMS or MMS. The user creates the new multimedia message using a messaging component of the mobile device, such as an SMS, MMS, or e-mail client.

At step 909, the user attaches the multimedia content to the new multimedia message. Different embodiments may be implemented using various technologies. For example, the multimedia message may be an MMS message to which the content is attached directly. In another example, the multimedia message may be an e-mail message to which the content is attached. In yet another example, an image could be attached directly to an SMS message or MMS message. In still another example, a multimedia message could be sent with a link back to the image on the mobile device if the mobile device is addressable over the network.

At step 911, the mobile device transmits the message addressed to the short code or other alias advertised by the advertisement from step 903. This may conclude the operations performed at the mobile device. Alternatively, a confirmation receipt may be returned to the mobile device at step 913.

Once the multimedia message has been transmitted, it flows through the extended network maintained, at least in part, by the user's carrier. Further operations, as illustrated in flow chart 900C, may be performed on the multimedia message by the aggregator or the destination itself if an aggregator is not used. Alternatively, the aggregator could implement the operations of the destination. A third party running a social network or promotion could implement the operations of the destination. Accordingly, no significance should be assumed from the description of certain acts being performed either by the aggregator or the destination. Rather, the operations occur, and may be implemented in part by the destination and in part by the aggregator, completely by the destination, completely by the aggregator, or in some other combination that differs from the particular assignments described here. As it is impossible to describe every conceivable combination and permutation of the divisions of labor, the reader is expected to understand that the various operations may be implemented using different components than those described here.

At step 917, the aggregator receives the message from the carrier and resolves the alias to a web address for the destination.

At step 919, the aggregator transmits the message to the destination at the web address.

At step 921, the destination resolves the message to its associated promotion. In this implementation, the multimedia message may include textual or other information that identifies the promotion. For example, the advertisement may instruct that users transmit a message that includes a trigger phrase, such as "baby contest" or "cute pets." This phrase allows the destination to identify the appropriate promotion.

At step 923, the destination handles the multimedia content of the message in whatever manner has been prescribed by the promotion. For instance, the promotion may direct that the message be re-transmitted to the customer in its entirety for handling by the customer. Alternatively, the destination may extract the content from the message and post the content to a public or private network accessible location.

In one example, the promotion may direct that the content be posted to a publicly accessible location for viewing by the public at large. In this example, a company having a visible public image may encourage individuals to capture images of a thing that relates to the company's image. A baby food company may encourage individuals to capture and send in cute pictures of their babies, for instance. These images may then be posted to a publicly accessible location for viewing by those individuals or anyone else, such as family members or the like.

In another example, the promotion may direct that the content be posted to a privately accessible location for viewing by only those having certain login credentials. In this example, a company may be engaging in a sweepstakes or contest in search of the "cutest baby" in the country or a particular region, the most "newsworthy story", or the like. The nature of such a promotion suggests that an individual should review the content prior to making the content publicly available, if at all.

Figure 10:
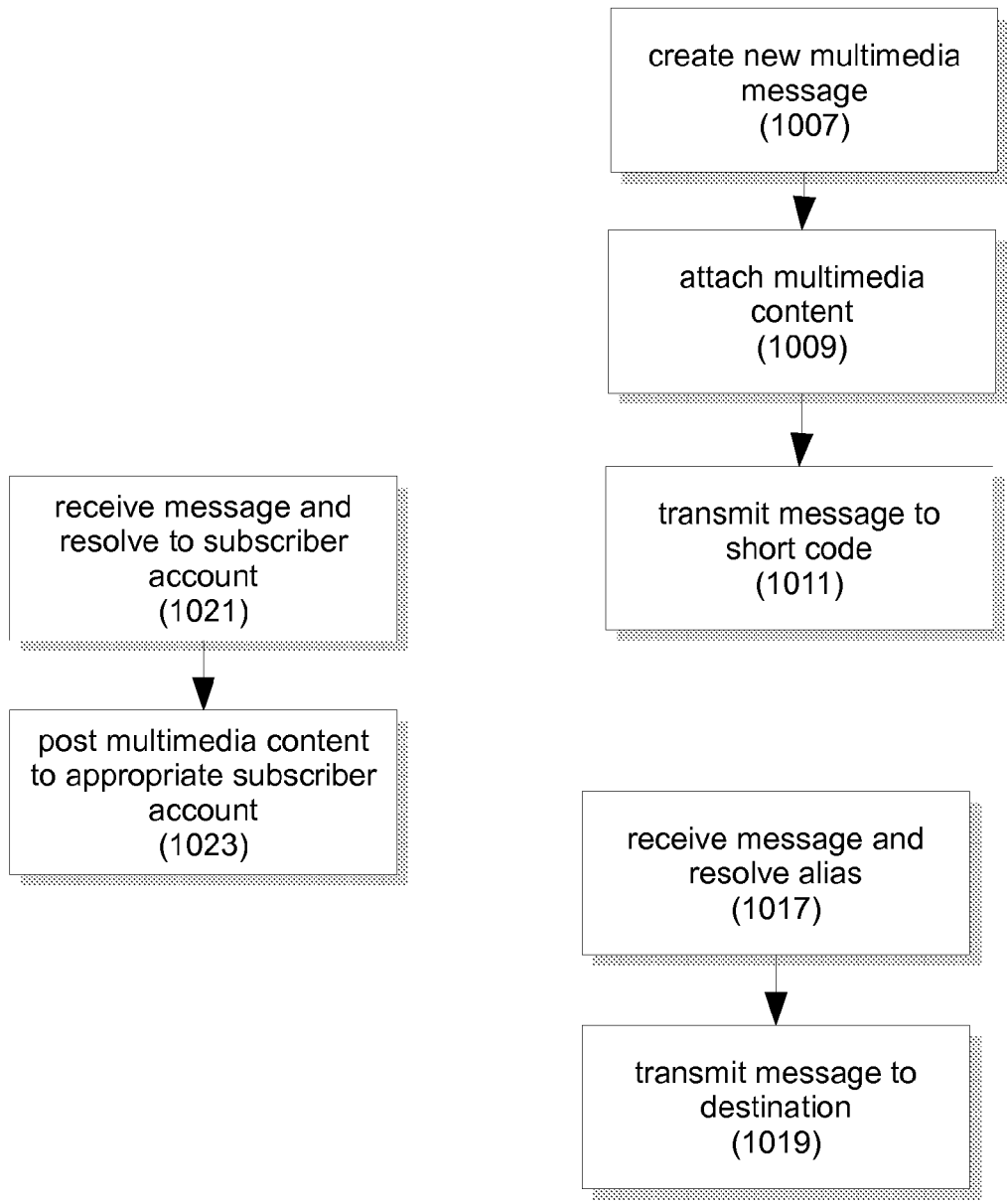
FIG. 10 is an operational flow diagram generally illustrating steps performed by a process for implementing the system described above in an online social network environment.

FIG. 10 is an operational flow diagram generally illustrating steps performed by a process for implementing the system described above in an online social network environment. For example, the described embodiments may be implemented to enable different users, having different mobile carriers, to easily upload multimedia content to a publicly or quasi-publicly shared location for comment or enjoyment by the users' peers, friends, relatives, co-workers, or the like. The cross-carrier nature of the disclosed embodiment opens up the social network and promotional platform to more users since the destination is accessible by users of more than a single carrier.

At step 1007, a user is inclined to share an image with other people in the user's social and/or professional circle. Accordingly, the user creates a new multimedia message on a mobile device. In one example, a user of the mobile device may have captured multimedia content using the mobile device. The content may take any one or more of several different forms, such as still images, video, and/or audio. The multimedia message may take several forms, such as SMS or MMS. The user creates the new multimedia message using a messaging component of the mobile device, such as an SMS, MMS, or e-mail client.

At step 1009, the user attaches the multimedia content to the new multimedia message. Different embodiments may be implemented using various technologies. For example, the multimedia message may be an MMS message to which the content is attached directly. In another example, the multimedia message may be an e-mail message to which the content is attached. In yet another example, an image could be attached directly to an SMS message. In still another example, a multimedia message could be sent with a link back to the image on the mobile device if the mobile device is addressable over the network.

At step 1011, the mobile device transmits the message addressed to a short code or other alias, as described above. This may conclude the operations performed at the mobile device. Alternatively, a confirmation receipt may be returned to the mobile device at step 1013.

At step 1017, the aggregator resolves the alias to a web address for the destination.

At step 1019, the aggregator transmits the multimedia message to the destination.

At step 1021, the destination identifies an appropriate subscriber account that corresponds to the multimedia message. In one example, the subscriber account may be directly identified in the multimedia message itself, such as a username or login included in the message.

At step 1023, the destination extracts the multimedia content from the message and posts it to a network accessible location. In one example, the multimedia content is posted to network storage that is protected by credentials under the control of the user.

The destination may perform any of many additional operations based on the particular application. For example, it is common in online social networks for a user to invite or otherwise associate others with the user's network account. In such a case, the destination may post the multimedia content to network storage associated with the user, and perform additional operations based on user configuration regarding the others that are affiliated with the user's account.

The examples are many, and include forwarding the multimedia content to individuals identified by the user or issuing a notice to those individuals that new content has been posted. Specific scenarios that are enabled by this process are included in the following example implementations.

Example Implementations of the Described System

Very many examples of embodiments that implement the systems described above will become apparent from the teachings of this disclosure. A non-exhaustive list of illustrative implementations is provided here to give the reader more guidance about the breadth of applications enabled by these systems. Implementations in addition to those presented here will also become apparent to those skilled in the art.

A broker of property (e.g., a realtor, car dealer, boat dealer etc.) can capture an image of the property and submit the image to a short code. The destination then transmits a notification (e.g., an e-mail message, multimedia message, instant message, RSS notification, or the like) to the broker's clients alerting them of the property. Savvy clients would enjoy the near-real-time notification of new offerings.

"Cute Baby" contest. A short code could be included on children's goods, such as shampoo bottles. A promotion could offer "College Scholarships", "Rewards Points", "Cash Prizes", "Affinity or Club Card Points"—where users can enter as many times as they wish.

"Roving Reporter" program: A media outlet could give away cash or prizes for best monthly news photo and/or video sent in.

Consumer product promotions. Retailers could offer sweepstakes such as "Submit photos of yourself with our product to this short code and Win Prizes!"

"Cute pet" contest. Promotion where a short code is printed on pet products, such as pet food or toys. Submit pictures of your pet to win.

School (college, high school) spirit contests.

TV Gameshow promotions. The TV viewing audience has an opportunity to submit pictures from their camera phone via short code—in real time during show—with their answers (or other appropriate feedback) via camera phone for a chance at winning a prize.

Reality TV based on scavenger hunt where the TV viewing audience is the first to submit picture of item requested by Host.

TV Show where participants are invited to send in their funny or interesting pictures or video.

Radio stations could ask listeners to submit pictures from their camera phone via short code to be displayed on station's web site and/or in exchange for prizes.

Traveler web site. Have a favorite motel, hotel, restaurant, rest area, or the like? Send it in and win!

Celebrity look-a-like contest site. Do you know somebody that looks like a celebrity? Have you ever seen someone at the store that resembles a famous person?

Celebrity spottersite. Catch a picture of a celebrity with a camera phone? Text it in and Win!

Spring Break Central! Web site that allows users to transmit Spring Break (or any vacation) pictures to win prizes!

Game Console web site. Gamers can text in pictures of high scores, game parties, or the like.

Insurance claims. Insurance agents or their insureds could take pictures of accident damage and easily submit them to expedite a claim.

Social Networking. Update social network site or profile with images sent from camera phone to short code. Convenient ease of use, plus "branded" method of upload with vanity short code.

Police/law enforcement. "Catch a Thief" program offering incentives for submitting content related to assistance with solving crime.

Search Engines. Upload pictures taken with camera phone to your preferred search engine.

Politicians. Submit pictures from debate, campaign trail, lobbyists, etc.

Consumer feedback. Provide a place to post pictures of favorite brands, products, service providers, etc.

Package delivery "photo confirmation." See picture of your significant other the moment after the roses are delivered.

Building & maintenance managers. Near real-time updates on conditions of buildings, property, etc.

Short codes on cartons of ice cream, frozen pizzas, packaging for flash memory, cans of soda, napkins at the ballpark or fast food restaurant, for use in a promotion.

Weddings, birthdays, vacations, contests, special events.

Online classified ads. Easily create or update photos of advertised goods or property.

Submit photos to online auctions. Submit online auction item from camera phone with short description in near real time. User can be prompted via email, text message or RSS notification reminder to go back in to describe auction item with greater detail, pricing info, etc.

Display of picture submitted via common short code to:
1. monitors or screens in ballparks; coffee shops, shopping malls, public areas (e.g., Times Square), offices, corporate places, etc.
2. display on highway or interstate monitors and animated billboards;
3. Camera phones with GPS capabilities could provide information that could be parsed to index photo information on either Social Networking sites, search engines, promotional endeavors and the like.
4. Content could be published via conventional methods (printed on containers, packaging, magazines, billboards, etc.).

Lottery type "play to win" games.

Certain non-exclusive embodiments have been introduced above to give the reader a full understanding of the features and capabilities of various implementations. In no way does the absence of a particular embodiment suggest that the appended claims, which alone define the scope of the invention, should be construed to exclude such embodiment. Rather, the appended claims should be given their broadest reasonable meaning, to include not only all the implementations and embodiments described herein, but also those embodiments and implementations which are too numerous to include in this document.

The invention claimed is:

1. In a communication system that includes a first mobile device configured to transmit an electronic message, and a second mobile device configured to transmit another electronic message, and at least two disparate communication service providers, the first mobile device being further configured to communicate with a first of the two disparate communication service providers but not directly with a second of the two disparate communication service providers, the second mobile device being configured to communicate with the second communication service provider, a method comprising:

receiving a first message initiated by the first mobile device and communicated over the first communication service provider, the first message identifying multimedia content that was captured with the first mobile device, the first message being addressed to an alias associated with a destination for the multimedia content;

causing the multimedia content to be stored at the destination in association with the first mobile device;

receiving a second message initiated by the second mobile device and communicated over the second communication service provider, the second message identifying other multimedia content that was captured with the second mobile device, the second message being addressed to the same alias as the first message;

causing the other multimedia content to be stored in association with the second mobile device; and making the multimedia content and the other multimedia content available at the destination.

2. The method recited in claim 1, wherein the multimedia content comprises a digital image, an audio recording, and/or a video.

3. The method recited in claim 1, wherein the alias comprises a common short code that is resolved into a network address associated with the destination.

4. The method recited in claim 1, wherein the alias comprises a short code, an e-mail address, a telephone number, a long code, and/or a network address.

5. The method recited in claim 1, wherein the destination comprises a social networking web site and causing the multimedia content to be stored at the destination further comprises storing the multimedia content for viewing in association with an account affiliated with the first mobile device.

6. The method recited in claim 1, wherein the destination operates in conjunction with an entity that facilitates a promotion through which the multimedia content is solicited in association with the alias.

7. The method recited in claim 1, further comprising transmitting a follow up communication to the first mobile device and/or the second mobile device based on the first message and/or the second message.

8. A method for conducting a promotion, comprising:

advertising a short code in association with a good and/or service, the short code identifying an address of a destination to which mobile devices may electronically transmit multimedia content over disparate wireless communications service providers;

receiving the multimedia content addressed to the short code from an originating mobile device, the multimedia content having been captured by the originating mobile device;

causing the multimedia content to be stored at the destination in association with the originating mobile device; and performing an action from a group comprising:
 issuing a notification that the multimedia content has been stored;
 rewarding an entity associated with the originating mobile device for providing the multimedia content; and
 making the multimedia content available to entities in addition to the entity associated with the originating mobile device.

9. The method recited in claim 8, wherein the method is performed in conjunction with a promotion of a good and/or a service.

10. The method recited in claim 8, wherein the method is performed in conjunction with a promotion of an event.

11. The method recited in claim 8, wherein the multimedia content comprises a digital image, an audio recording, and/or a video.

12. The method recited in claim 8, wherein the short code comprises a common short code that is resolved into a network address associated with the destination.

13. The method recited in claim 8, wherein the short code comprises a common short code, an e-mail address, a telephone number, a long code, and/or a network address.

14. The method recited in claim 8, wherein the destination comprises a social networking web site and causing the multimedia content to be stored at the destination further comprises storing the multimedia content for viewing in association with an account affiliated with the originating mobile device.

15. A communication system that includes a first mobile device configured to transmit an electronic message, and a second mobile device configured to transmit another electronic message, and at least two disparate communication service providers, the first mobile device being further configured to communicate with a first of the two disparate communication service providers but not directly with a second of the two disparate communication service providers, the second mobile device being configured to communicate with the second communication service provider, the system comprising:

a destination reachable from the first mobile device using the first communication service provider and from the second mobile device using the second communication service provider, a network location of the destination being identified by a common short code, the destination including components operative to cause multimedia content received from either the first mobile device or the second mobile device to be stored in association with the mobile device from which the multimedia content was received, the destination being further configured to perform an action from a group of actions comprising:
 to issue a notification that the multimedia content has been stored;
 to reward an entity associated with the mobile device from which the multimedia content was received for providing the multimedia content; and
 to make the multimedia content available to entities in addition to the entity associated with the mobile device from which the multimedia content was received.

16. The system recited in claim 15, wherein the destination comprises a social networking service.

17. The system recited in claim 15, wherein the destination comprises an entity implementing a promotion through which the multimedia content is solicited in association with the common short code.

18. The system recited in claim 15, further comprising an aggregator configured to resolve the common short code into the network location of the destination, and further wherein the destination is collocated with the aggregator.

19. The system recited in claim 15, wherein the multimedia content comprises a digital image, an audio recording, and/or a video.

20. The system recited in claim 15, wherein the destination is further configured to transmit a follow up communication to the first mobile device and/or the second mobile device based on the multimedia content.

* * * * *